(12) United States Patent
Nibarger

(10) Patent No.: US 7,190,539 B1
(45) Date of Patent: Mar. 13, 2007

(54) MAGNETIC RECORDER HAVING CARBON NANOTUBES EMBEDDED IN ANODIC ALUMINA FOR EMITTING ELECTRON BEAMS TO PERFORM HEAT-ASSISTED MAGNETIC RECORDING

(75) Inventor: John P. Nibarger, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 286 days.

(21) Appl. No.: 11/025,699

(22) Filed: Dec. 29, 2004

(51) Int. Cl.
*G11B 5/02* (2006.01)
(52) U.S. Cl. ............................................. 360/59
(58) Field of Classification Search ............... None
See application file for complete search history.

(56) References Cited

U.S. PATENT DOCUMENTS

| | | | |
|---|---|---|---|
| 5,557,596 A | 9/1996 | Gibson et al. | |
| 5,780,101 A | 7/1998 | Nolan et al. | |
| 5,965,267 A | 10/1999 | Nolan et al. | |
| 6,278,231 B1 | 8/2001 | Iwasaki et al. | |
| 6,359,288 B1 | 3/2002 | Ying et al. | |
| 6,636,460 B2 | 10/2003 | Akiyama et al. | |
| 6,800,865 B2* | 10/2004 | Nakayama et al. | 250/492.3 |
| 6,878,444 B2* | 4/2005 | Suzuki et al. | 428/375 |
| 6,920,014 B2* | 7/2005 | Sato et al. | 360/234.5 |
| 2002/0057511 A1 | 5/2002 | Kikitsu et al. | |
| 2003/0007443 A1 | 1/2003 | Nickel | |
| 2003/0017364 A1 | 1/2003 | Kikitsu et al. | |
| 2003/0214742 A1 | 11/2003 | Kai et al. | |
| 2006/0181798 A1* | 8/2006 | Higuchi | 360/59 |
| 2006/0184843 A1* | 8/2006 | Oakley | 714/100 |

OTHER PUBLICATIONS

B. Q. Wei et al., "Reliability and Current Carrying Capacity of Carbon Nanotubes," Applied Physics Letters, vol. 79, No. 8, Aug. 20, 2001, pp. 1172-1174.*
Nonlithographic Nano-Wire Arrays: Fabrication, Physics, and Device Applications, Dmitri Routkevitch, A.A. Tager, IEEE Transactions on Electron Devices, vol. 43, No. 10, Oct. 1996.

* cited by examiner

*Primary Examiner*—Andrea Wellington
*Assistant Examiner*—Glenda P. Rodriguez
(74) *Attorney, Agent, or Firm*—Brooks Kushman P.C.

(57) ABSTRACT

A heat-assisted magnetic recorder for magnetically recording information onto a recording medium having a given recording coercive field includes an electron beam generator and a magnetic recording head. The electron beam generator directs an electron beam onto the recording medium in order to locally heat a portion of the recording medium such that the heated recording medium portion has a recording coercive field lower than the given recording coercive field. The magnetic recording head generates a magnetic recording field having an intensity greater than the recording coercive field of the heated recording medium portion in order to magnetically record information onto the heated recording medium portion. The electron beam generator includes a plurality of carbon nanotubes (CNTs) embedded in nanoholes of an anodic alumina template for generating the electron beam. A heat-assisted magnetic recording method is associated with the heat-assisted magnetic recorder.

16 Claims, 2 Drawing Sheets

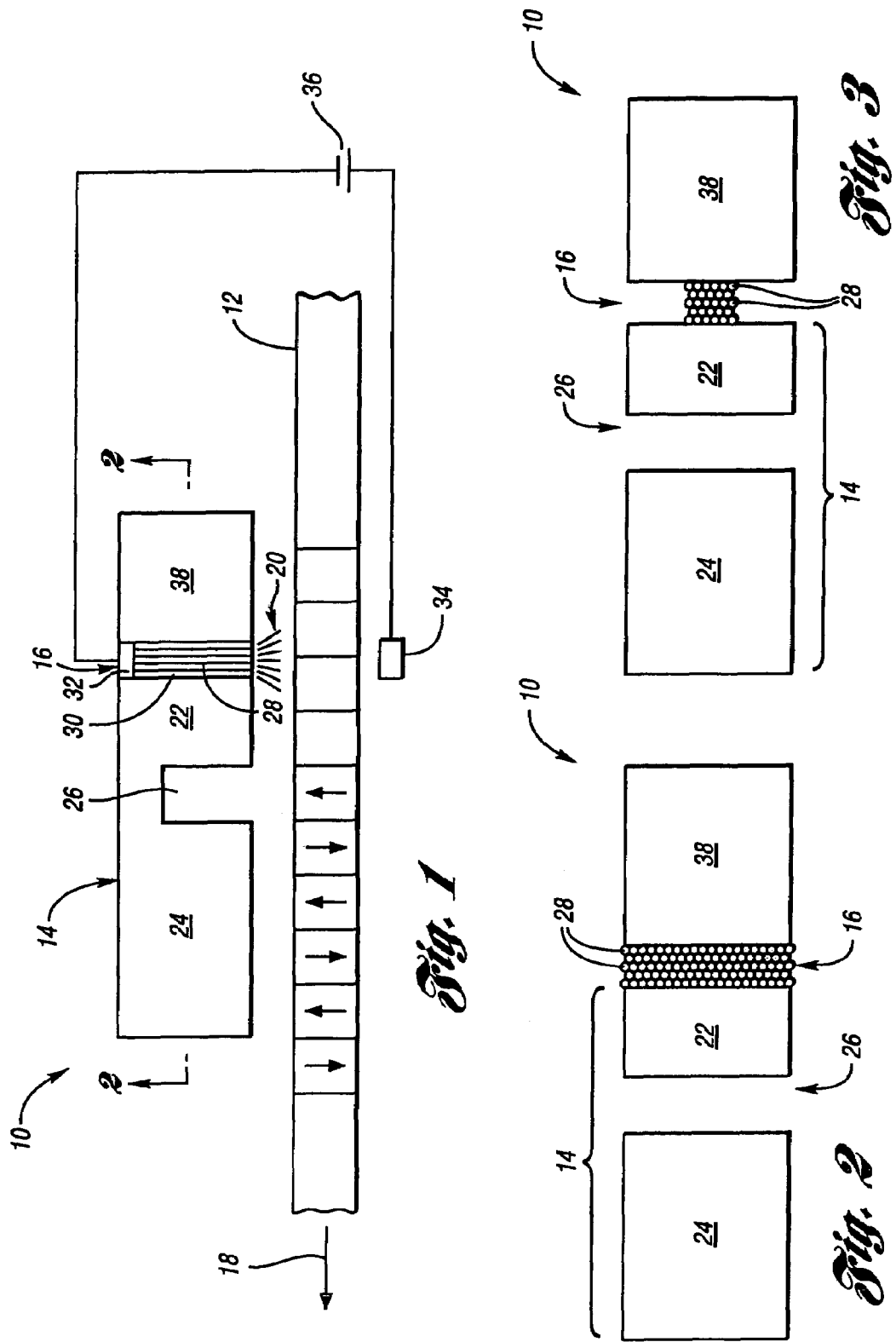

MAGNETIC RECORDER HAVING CARBON NANOTUBES EMBEDDED IN ANODIC ALUMINA FOR EMITTING ELECTRON BEAMS TO PERFORM HEAT-ASSISTED MAGNETIC RECORDING

BACKGROUND OF THE INVENTION

1. Field of the Invention

The present invention generally relates to heat-assisted magnetic recorders and, more particularly, to a magnetic recorder having carbon nanotubes (CNTs) embedded in an anodic alumina template for emitting electron beams onto a magnetic recording medium in order to perform heat-assisted magnetic recording of the medium.

2. Background Art

Magnetic recording mediums for recording information have a magnetic layer comprised of minute magnetic grains. Magnetic domains recorded on the magnetic layer have to be small enough to accommodate high-density recording carried out by a magnetic recording head. In order to enable clear distinction of small recording magnetic domains, the boundaries of the domains should be smooth enough, and this results in the reduction of the grain size. The propagation of magnetization reversal among the grains distorts the domain boundary. Thus, individual grains can be isolated magnetically by nonmagnetic substances to prevent exchange coupling interaction among the grains. Moreover, from the viewpoint of the magnetic interaction between the head and the medium, the magnetic layer has to be thin enough for the high-density recording.

To satisfy those requirements, the volume of the magnetization reversal unit (whose size becomes almost equal to that of a grain as more of those requirements are met) has to decrease as the density increases. However, if the volume of the magnetization reversal unit is diminished, then the magnetic anisotropy energy of the unit ($K_u$ (density of magnetic anisotropy energy) * V (volume of the magnetization reversal unit)) becomes smaller than the thermal fluctuation energy, and it will be no longer possible to maintain the domains. This is the thermal fluctuation phenomenon. The physical limit of recording density governed by this phenomenon is called the thermal fluctuation limit or the superparamagnetic limit.

For shrinking magnetic grain volumes, magnetization reversal by thermal fluctuation can be prevented if the magnetic anisotropy energy density ($K_u$) is increased. However, because the recording coercive field ($H_c$) of the magnetization in the recording medium is substantially proportional to $K_u$, a magnetic recording field at or above $H_c$ is required for achieving a sufficient recording in the medium. In this connection, it is noted that magnetic recording head characteristics which determine the magnetic recording field are rapidly reaching their physical limit, making it unreasonable to expect a further improvement in the magnetic recording field. That is, it is becoming increasingly difficult to comply with the demands for the increased recording density by simply increasing $K_u$.

Accordingly, recording onto a medium at room temperature and a large $K_u$ value is not possible because the magnetic field intensity necessary for recording exceeds the intensity of a magnetic recording field generated by a magnetic head. This problem of recording to mediums having relatively large $K_u$ values is solved by the use of so-called "heat-assisted magnetic recording" systems. In a heat-assisted magnetic recording system, a heater locally heats a medium during recording in order to lower the recording coercive field ($H_c$) of the medium lower than the intensity of the magnetic recording field generated by a head. As a result, the head is able to record information on the medium at the heated location.

A laser beam generator is typically used as a heater in heat-assisted magnetic recording systems. A laser beam generator directs a laser beam onto the medium in order to locally heat the medium where data bits are to be recorded by the head. The problem with using a laser beam generator to locally heat a medium is that it is difficult to efficiently deliver laser beam power to a relatively small area of the medium. The area of the medium to be heated is relatively small because the sizes of the data bits to be recorded to this area are correspondingly small (on the order of 20 nm to 50 nm). As such, the data bit sizes are significantly below the diffraction limit of a typical laser beam generator. For example, the diffraction limit for a 500 nm light with a numerical aperture of one is 305 nm. As a result, a diffraction limited laser beam undesirably heats adjacent tracks of the medium.

Smaller areas can be heated with a laser through the use of near-field optics. In near-field optics, only a small percentage of the total light is incident in the desired area to be heated. Efficiencies for near-field optics are correspondingly small and the energy not transmitted to the medium must be removed from the head somehow. The subsequent heating of the head can be problematic for actual devices.

SUMMARY OF THE INVENTION

Accordingly, it is an object of the present invention to provide a magnetic recorder having carbon nanotubes (CNTs) embedded in anodic alumina for emitting electron beams onto a magnetic recording medium in order to perform heat-assisted magnetic recording of the medium.

It is another object of the present invention to provide a heat-assisted magnetic recording method in which electron beams are emitted from CNTs embedded in anodic alumina in order to heat a given location of a magnetic recording medium to enable information to be magnetically recorded onto the medium at the heated location.

It is a further object of the present invention to provide a magnetic recorder having CNTs embedded in a self-organized anodic alumina for locally heating a magnetic recording medium with electron beams and further having a magnetic recording head for writing information onto the medium at the heated location while the heated location remains heated.

It is still another object of the present invention to provide a magnetic recorder having an electron beam generator comprised of CNTs embedded in anodic alumina for heating a given location of a magnetic recording medium with electron beams as the medium passes the electron beam generator, and further having a magnetic recording head positioned downstream from the electron beam generator for writing information onto the given location of the medium as the medium passes the head.

It is still a further object of the present invention to provide a heat-assisted magnetic recording method which includes emitting electron beams from CNTs embedded in anodic alumina in order to heat a given location of a magnetic recording medium as the given location of the medium passes the CNTs, and which further includes subsequently generating a magnetic recording field from a magnetic head to magnetically record information at the given location of the medium as the given location of the medium passes the head.

In carrying out the above objects and other objects, the present invention provides a heat-assisted magnetic recorder for magnetically recording information onto a recording medium such as a magnetic disk having a given recording coercive field. The recorder includes an electron beam generator and a magnetic recording head. The electron beam generator directs an electron beam onto the recording medium in order to locally heat a portion of the recording medium such that the heated recording medium portion has a recording coercive field lower than the given recording coercive field. The magnetic recording head generates a magnetic recording field having an intensity greater than the recording coercive field of the heated recording medium portion in order to magnetically record information onto the heated recording medium portion. The electron beam generator includes a plurality of carbon nanotubes (CNTs) embedded in nanoholes of an anodic alumina template for generating the electron beam.

The anodic alumina template includes top and bottom surfaces with the nanoholes extending between the top and bottom surfaces of the anodic alumina template and the CNTs being embedded in the nanoholes between the top and bottom surfaces of the anodic alumina template. The electron beam generator further includes a substrate, an electrode, and a voltage source. The substrate may include, for example, semiconductors, noble metals, Mn, Fe, Co, Ni, Cu, and carbon.

The substrate is positioned on the top surface of the anodic alumina template such that the CNTs are connected at one end to the substrate. Ends of the CNTs along the bottom surface of the anodic alumina template and the electrode face each other. The voltage source is connected to the substrate and the electrode such that the CNTs generate the electron beam upon application of a voltage by the voltage source with the electron beam extending between the bottom surface of the anodic alumina template and the electrode.

The electron beam generator is positioned upstream of the magnetic recording head such that the electron beam generator heats the portion of the recording medium when the portion of the recording medium is positioned adjacent to the electron beam generator and then the magnetic recording head generates the magnetic recording field to magnetically record information onto the heated recording medium portion once the heated recording medium portion has been moved adjacent to the magnetic recording head.

The magnetic recording head may include a main magnetic pole and a return magnetic pole separated by a write gap for generating the magnetic recording field. The main magnetic pole being upstream from the return magnetic pole. The recorder may further include a shield in which the electron beam generator is positioned between the shield and the magnetic recording head.

The anodic alumina template may have a size sufficient for holding an adequate amount of spaced apart CNTs for the CNTs to generate the electron beam with an area sized to locally heat multiple tracks of the portion of the recording medium. Alternately, the anodic alumina template may have a size sufficient for holding an adequate amount of spaced apart CNTs for the CNTs to generate the electron beam with an area focused to locally heat a single track of the portion of the recording medium.

Further, in carrying out the above objects and other objects, the present invention provides a heat-assisted magnetic recording method for magnetically recording information onto a recording medium such as a magnetic disk having a given recording coercive field. The method includes applying a voltage between a plurality of carbon nanotubes (CNTs) embedded in an anodic alumina template and an anode in order to generate an electric field between the CNTs and the anode such that the CNTs generate an electron beam in response to the electric field. A portion of the magnetic disk is then positioned between the CNTs and the anode such that the electron beam generated by the CNTs impinges on the portion of the magnetic disk and locally heats the portion of the magnetic disk causing the heated magnetic disk portion to have a recording coercive field lower than the given recording coercive field. While the heated magnetic disk portion remains heated, a magnetic recording field having an intensity greater than the recording coercive field of the heated magnetic disk portion is directed onto the heated magnetic disk portion in order to magnetically record information onto the heated magnetic disk portion.

The heated magnetic disk portion may be positioned away from the electron beam prior to directing the magnetic recording field onto the heated magnetic disk portion.

BRIEF DESCRIPTION OF THE DRAWINGS

FIG. 1 illustrates a cross-sectional view of a heat-assisted magnetic recorder in accordance with an embodiment of the present invention;

FIG. 2 illustrates a top view of the heat-assisted magnetic recorder taken along the line 2—2 of FIG. 1;

FIG. 3 illustrates a top view of a variation of the heat-assisted magnetic recorder taken along the line 2—2 of FIG. 1;

DETAILED DESCRIPTION OF THE PREFERRED EMBODIMENT(S)

Figure 4:
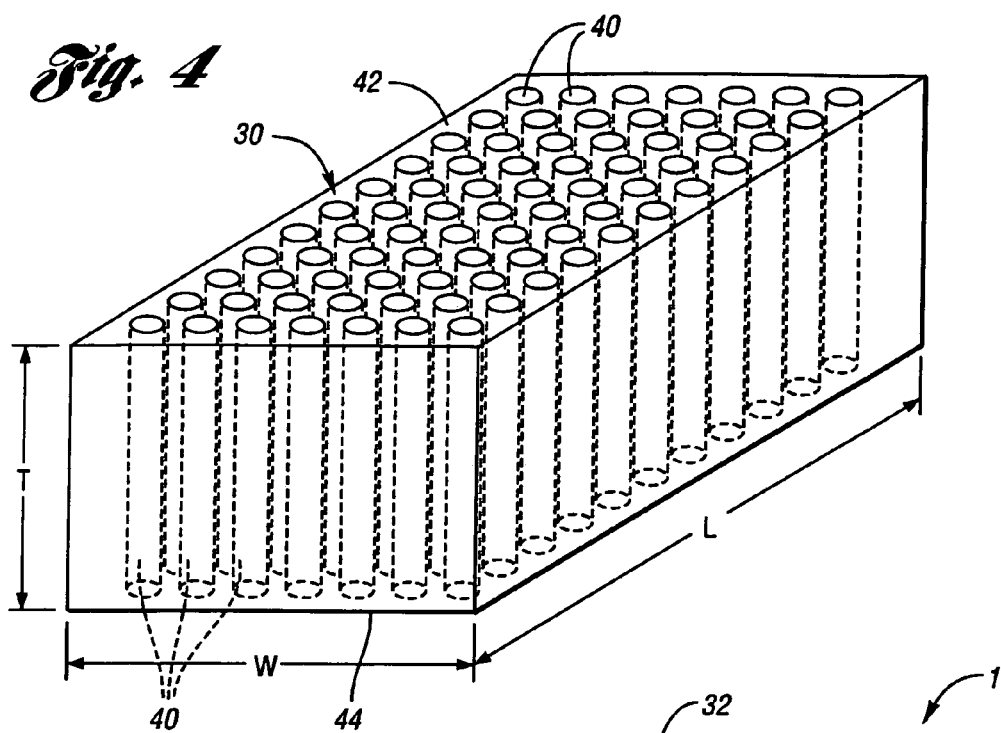
FIG. 4 illustrates a perspective view of an anodic alumina template which forms part of an electron beam generator of the heat-assisted magnetic recorder.

Referring now to FIG. 1, a cross-sectional view of a heat-assisted magnetic recorder 10 (i.e., a thermally-assisted magnetic recorder 10) in accordance with an embodiment of the present invention is shown. Magnetic recorder 10 is used for magnetically recording information to a magnetic recording medium such as a magnetic disk 12. Magnetic recorder 10 generally includes a magnetic recording head 14 and an electron beam generator 16 (i.e., electron bean emitter 16). Recording head 14 and electron beam generator 16 function together to perform heat-assisted magnetic recording of information onto disk 12.

Magnetic recorder 10 is spaced relatively close to disk 12 (on the order of 100 nm or less) in order to magnetically record information onto the disk. Magnetic recorder 10 magnetically records information onto disk 12 as the disk moves relative to the magnetic recorder in the direction indicated by arrow 18. The relative movement between magnetic recorder 10 and disk 12 is accomplished by either the disk moving in direction 18 while the magnetic recorder is stationary or the magnetic recorder moving in an opposite direction while the disk is stationary. Electron beam generator 16 is positioned between recording head 14 and a shield 38. As such, electron beam generator 16 is positioned upstream from recording head 14. As a result, during the magnetically recording operation, a given location of disk 12 passes by electron beam generator 16 and then subsequently passes by recording head 14 as the disk moves relative to magnetic recorder.

To perform heat-assisted magnetic recording onto disk 12, electron beam generator 16 directs an electron beam 20 onto a portion of the disk which is adjacent to the electron beam generator in order to heat this disk portion. As magnetic recorder 10 and disk 12 are spaced fairly close together, the dispersion of electron beam 20 is minimal and the electron beam locally heats the disk portion. The energy from electron beam 20 heats the disk portion such that the recording coercive field ($H_c$) of this disk portion is lowered while it is heated. The $H_c$ of the heated disk portion is lowered such that the magnetic field intensity of recording head 14 is greater than $H_c$ in order to magnetically record information onto the heated disk portion.

Disk 12 then moves in direction 18 such that the heated disk portion passes from electron beam generator 16 and moves adjacent to recording head 14. Recording head 14 then generates a magnetic recording field having an intensity greater than the lowered $H_c$ of the heated disk portion in order to magnetically record information onto the heated disk portion.

Recording head 14 includes a main magnetic pole 22 and a return magnetic pole 24 which are separated by a write gap 26. Electrical coils (not shown) are wrapped around recording head 14. The elements of recording head 14 function together to generate a magnetic recording field having a given intensity in order to magnetically record information onto disk 12. Recording head 14 generates the magnetic recording field such that magnetic flux passes from main pole 22 to the heated disk portion adjacent through a magnetically conductive underlayer to recording head 14 and then back to return pole 24.

The magnetic flux passing through the heated portion of disk 12 causes a magnetic data bit of information to be recorded onto this disk portion. The magnetic data bit has either an upward or downward magnetic orientation as indicated by the arrows contained within individual segments of disk 12 as shown in FIG. 1. The orientation of the magnetic data bit depends upon the orientation of the magnetic recording field. That is, if the orientation of the magnetic recording field passing from recording head 14 through a heated portion of disk 12 is upward, then the orientation of the magnetic data bit recorded onto this disk portion is upward. Likewise, if the orientation of the magnetic recording field passing from recording head 14 through a heated portion of disk 12 is downward, then the orientation of the magnetic data bit recorded onto this disk portion is downward.

Magnetic flux from recording head 14 which causes the magnetic data bits to have either an upward or downward orientation corresponds to perpendicular recording. Of course, recording head 14 may generate a magnetic recording field such that the magnetic flux causes the magnetic data bits to have either a leftward or rightward orientation. This corresponds to longitudinal recording. As such, the basic components of recording head 14 are capable of carrying out both perpendicular recording and longitudinal recording. However, a recording head optimized for perpendicular recording may not be optimized for longitudinal recording. In addition, the magnetic media must also be optimized for either longitudinal or perpendicular recording.

As indicated above, the intensity of the magnetic recording field generated by recording head 14 must be greater than the intensity of the $H_c$ of the heated portion of disk 12 in order for information to be magnetically recorded onto this portion of the disk. As such, the magnetic recording field has a sufficient intensity to overcome the $H_c$ of the heated portion of disk 12 because the heat effectively lowers the $H_c$ of this disk portion to a level which is lower than the magnetic recording field intensity. That is, if this portion of disk 12 was not heated, then the $H_c$ of this disk portion would maintain its original intensity which is higher than the magnetic recording field intensity. Consequently, the magnetic recording field would not be strong enough to overcome the $H_c$ of a non-heated disk portion and information could not be magnetically recorded to this disk portion.

As such, it is appreciated that recording head 14 has to transfer magnetic flux through a disk portion when the disk portion is heated in order to magnetically record information to this disk portion. This is accomplished as electron beam generator 16 directs an electron beam 20 onto a disk portion in order to heat this disk portion. The heated disk portion is then immediately moved adjacent to recording head 14 such that the disk portion is still heated at the point in time in which the recording head generates a magnetic recording field for magnetically recording information onto the disk portion.

The advantage of using electron beam 20 from electron beam generator 16 to heat a localized portion of disk 12 is that the electron beam can be delivered efficiently to the localized portion of the disk. That is, electron beam 20 is focused enough to radiate a relatively small area (on the order of 20 nm) of disk 12 without radiating adjoining areas of the disk. As indicated above, electron beam generator 16 and disk 12 are spaced fairly close together (on the order of 100 nm or less). Consequently, dispersion of electron beam 20 relative to disk 12 is minimal. As a result, electron beam 20 is focused enough to locally heat a relatively small area of disk 12 without heating adjoining areas of the disk.

In accordance with the present invention, electron beam generator 16 is embodied as an array of carbon nanotubes (CNTs) 28 embedded in a self-organized anodic alumina template 30. Anodic alumina template 30 has an array of nanotubes in which CNTs 28 are embedded. Anodic alumina template 30 is positioned at one end on a substrate 32. The substrate may be formed of, for example, semiconductors, noble metals, Mn, Fe, Co, Ni, Cu, and carbon. CNTs 28 extend out from substrate 32 through the nanotubes of anodic alumina template 30 to point towards disk 12 as shown in FIG. 1.

CNTs 28 generate electron beam 20 such that the electron beam extends from the ends of the CNTs pointed towards disk 12 and then impinges on the disk. To this end, electron beam generator 16 further includes an anode 34 which is positioned on the other side of disk 12 and is aligned with CNTs 28. A voltage 36 is applied between anode 34 and substrate 32. As CNTs 28 are connected to substrate 32, applied voltage 36 between the substrate and anode 34 causes the CNTs to emit a beam of electrons 20.

The following exemplary calculation shows that electron beam 20 generated by CNTs 28 has the required energy for locally heating disk 12. Assume that electron beam 20 has an energy of 50 eV and a current of 1 µA in a time of 10 nsec and that the efficiency of converting electron beam energy to heat is 10%. That is, V=50 V, I=1 µA, efficiency=0.10, beam time 10 ns, poWer=I*V, and energy=power*beam time*efficiency. Assume that the volume of the disk portion which is to be heated (i.e., a mass of iron (Fe)) is 40 nm thick*40 nm long*40 nm wide. As such, the volume of the disk portion is 40 nm³. (It is likely that the disk portion to be heated will have a smaller volume such as 20 nm³.) The $\rho_{Fe}$ of the disk portion is 7860 kg/m³. Accordingly, the mass of the disk portion is (volume*$\rho_{Fe}$).

The total energy "Q" deposited into the mass of the disk portion to be heated is energy/mass. The temperature change $\Delta t=Q/C_{Fe}$ is the total heat divided by the specific heat of iron ($C_{Fe}$=448 J/(kg*K)). Thus, $\Delta t$=221 K.

Thus, 1 μA of current at 50 volts will heat up a cube of iron 40 nm on a side by 221°. For appropriately designed magnetic media this temperature change is more than enough heat to lower the $H_c$ of the heated disk portion to a level below the intensity of the magnetic recording field generated by recording head 14. As a result, upon electron beam 20 heating a localized portion of disk 12, recording head 14 is able to magnetically record information to this heated disk portion.

Referring now to FIGS. 2 and 3, with continual reference to FIG. 1, top views of magnetic recorder 10 are shown. In these top views, magnetic recorder 10 is positioned above disk 12 (not shown). In FIG. 2, electron beam generator 16 has a large enough amount of CNTs 28 to heat a relatively large area of disk 12. That is, in FIG. 2, electron beam generator 16 has a sufficient amount of CNTs 28 positioned between main pole 22 of recording head 14 and shield 38 which are spread across a relatively large area. This is configuration is useful when heating multiple tracks of disk 12 across a particular location of the disk. In FIG. 3, electron beam generator 16 has a smaller amount of CNTs 28 to heat a relatively small area of disk 12. That is, in FIG. 3, electron beam generator 16 has a sufficient amount of CNTs 28 positioned between main pole 22 of recording head 14 and shield 38 which are spread across a relatively small area. This configuration is useful when heating a single track of disk 12 at a particular location of the disk.

Referring now to FIG. 4, a perspective view of anodic alumina template 30 is shown. Anodic alumina template 30 has a length L, a width W, and a thickness T. Anodic alumina template 30 has a plurality of non-interconnected nanotubes generally designated by reference numeral 40. Nanotubes 40 are non-interconnected in the sense that the nanotubes do not contain apertures or openings to any other of the nanotubes. Each nanotube 40 is filled with carbon to form carbon nanotubes (CNTs) 28. Each CNT 28 extends within a respective nanotube 40 between top surface 42 and bottom surface 44 of anodic alumina template 30 along the thickness T of the anodic alumina template.

Figure 5:
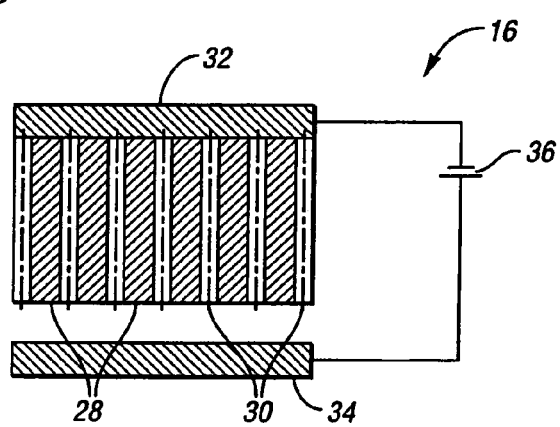
FIG. 5 illustrates a cross-sectional view of the electron beam generator of the heat-assisted magnetic recorder.

Referring now to FIG. 5, with continual reference to FIGS. 1 and 4, a cross-sectional view of electron beam generator 16 is shown. Top surface 42 (or alternatively bottom surface 44) of anodic alumina template 30 is positioned on substrate 32. Nanotubes 40 of anodic alumina template 30 are filled with CNTs 28. CNTs 28 are connected at one end to substrate 32. The other ends of CNTs 28 face out from bottom surface 44 (or alternatively top surface 42) of anodic alumina template 30. Anode 34 is disposed such that the other ends of CNTs 28 face the anode. Voltage 36 is applied between substrate 32 and anode 34. Applied voltage 36 creates an electric field between anode 34 and the ends of CNTs 28 facing the anode. This electric field causes CNTs 28 to emit electron beam 20 in the direction of anode 34.

As described above with reference to FIG. 1, disk 12 is positioned between CNTs 28 and anode 34. Consequently, disk 12 receives electron beam 20 generated by CNTs 28.

Figure 6:
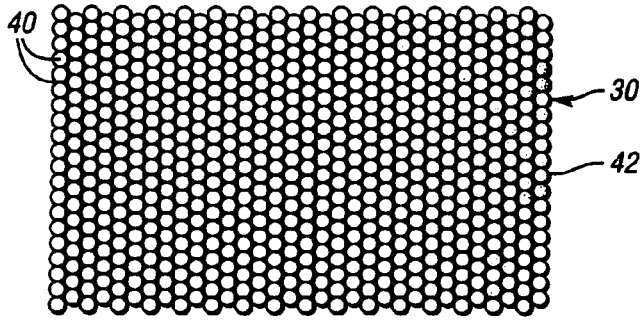
FIG. 6 illustrates a microscopic image of an end surface of the anodic alumina template shown in FIG. 4.
Figure 7:
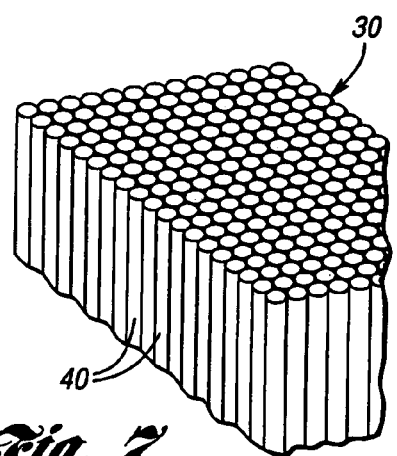
FIG. 7 illustrates a side perspective microscopic image of the anodic alumina template shown in FIG. 4.

Referring now to FIG. 6, a microscopic image of top surface 42 of anodic alumina template 30 is shown. Referring now to FIG. 7, a side perspective microscopic image of anodic alumina template 30 is shown. Both images of FIGS. 6 and 7 show nanotubes 40 (not numbered in FIGS. 6 and 7) of anodic alumina template 30. As described above, nanotubes 40 are filled with carbon to form CNTs 28.

Thus, it is apparent that there has been provided, in accordance with the present invention, a magnetic recorder having carbon nanotubes (CNTs) embedded in an anodic alumina template for emitting electron beams onto a magnetic recording medium in order to perform heat-assisted magnetic recording of the medium that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A heat-assisted magnetic recorder for magnetically recording information onto a recording medium having a given recording coercive field, the recorder comprising:

an electron beam generator operable to direct an electron beam onto the recording medium in order to locally heat a portion of the recording medium such that the heated recording medium portion has a recording coercive field lower than the given recording coercive field; and a magnetic recording head operable to generate a magnetic recording field having an intensity greater than the recording coercive field of the heated recording medium portion in order to magnetically record information onto the heated recording medium portion;

wherein the electron beam generator includes a plurality of carbon nanotubes (CNTs) embedded in nanoholes of an anodic alumina template for generating the electron beam.

2. The recorder of claim 1 wherein:

the anodic alumina template includes top and bottom surfaces with the nanoholes extending between the top and bottom surfaces of the anodic alumina template and the CNTs being embedded in the nanoholes between the top and bottom surfaces of the anodic alumina template;

wherein the electron beam generator further includes a substrate, an electrode, and a voltage source, wherein the substrate is positioned on the top surface of the anodic alumina template such that the CNTs are connected at one end to the substrate, wherein ends of the CNTs along the bottom surface of the anodic alumina template and the electrode face each other, wherein the voltage source is connected to the substrate and the electrode such that the CNTs generate the electron beam upon application of a voltage by the voltage source with the electron beam extending between the bottom surface of the anodic alumina template and the electrode.

3. The recorder of claim 2 wherein:

the electron beam generator is positioned upstream of the magnetic recording head such that the electron beam generator heats the portion of the recording medium when the portion of the recording medium is positioned adjacent to the electron beam generator and then the magnetic recording head generates the magnetic recording field to magnetically record information onto the heated recording medium portion once the heated recording medium portion has been moved adjacent to the magnetic recording head.

4. The recorder of claim 3 wherein:
the magnetic recording head includes a main magnetic pole and a return magnetic pole separated by a write gap for generating the magnetic recording field, the main magnetic pole being upstream from the return magnetic pole.

5. The recorder of claim 3 further comprising:
a shield, wherein the electron beam generator is positioned between the shield and the magnetic recording head.

6. The recorder of claim 3 wherein:
the anodic alumina template has a size sufficient for holding an adequate amount of spaced apart CNTs for the CNTs to generate the electron beam with an area sized to locally heat multiple tracks of the portion of the recording medium.

7. The recorder of claim 3 wherein:
the anodic alumina template has a size sufficient for holding an adequate amount of spaced apart CNTs for the CNTs to generate the electron beam with an area focused to locally heat a single track of the portion of the recording medium.

8. The recorder of claim 1 wherein:
the recording medium is a disk.

9. A heat-assisted magnetic recording head for magnetically recording information onto a magnetic disk having a given recording coercive field, the head comprising:
an electron beam generator operable to direct an electron beam onto a portion of the magnetic disk upon the portion of the magnetic disk being positioned directly beneath the electron beam generator in order to locally heat the portion of the magnetic disk such that the heated magnetic disk portion has a recording coercive field lower than the given recording coercive field; and
a main magnetic pole positioned adjacent to the electron beam generator, the main magnetic pole operable to generate a magnetic recording field having an intensity greater than the recording coercive field of the heated magnetic disk portion in order to magnetically record information onto the heated magnetic disk portion upon the heated magnetic disk portion being positioned directly beneath the main magnetic pole while remaining heated;
wherein the electron beam generator includes an anodic alumina, template having nanoholes, the electron beam generator further including a plurality of carbon nanotubes (CNTs) embedded in respective ones of the nanoholes of the anodic alumina template, wherein the CNTs generate the electron beam for heating the magnetic disk portion upon the application of an electric field between the CNTs and an anode positioned directly beneath the magnetic disk portion.

10. The head of claim 9 wherein:
the anodic alumina template includes top and bottom surfaces with the nanoholes extending between the top and bottom surfaces of the anodic alumina template and the CNTs being embedded in the nanoholes between the top and bottom surfaces of the anodic alumina template;
wherein the electron beam generator further includes a substrate and a voltage source, wherein the substrate is positioned on the top surface of the anodic alumina template such that the CNTs are connected at one end to the substrate, wherein ends of the CNTs along the bottom surface of the anodic alumina template and the anode face each other, wherein the voltage source is connected to the substrate and the anode such that the CNTs generate the electron beam upon application of a voltage by the voltage source with the electron beam extending between the bottom surface of the anodic alumina template and the magnetic disk portion.

11. The head of claim 9 wherein:
the anodic alumina template has a size sufficient for holding an adequate amount of spaced apart CNTs for the CNTs to generate the electron beam with an area sized to locally heat multiple tracks of the magnetic disk portion.

12. The head of claim 9 wherein:
the anodic alumina template has a size sufficient for holding an adequate amount of spaced apart CNTs for the CNTs to generate the electron beam with an area focused to locally heat a single track of the magnetic disk portion.

13. A heat-assisted magnetic recording method for magnetically recording information onto a magnetic disk having a given recording coercive field, the method comprising:
applying a voltage between a plurality of carbon nanotubes (CNTs) embedded in an anodic alumina template and an anode in order to generate an electric field between the CNTs and the anode such that the CNTs generate an electron beam in response to the electric field;
positioning a portion of the magnetic disk between the CNTs and the anode such that the electron beam generated by the CNTs impinges on the portion of the magnetic disk and locally heats the portion of the magnetic disk causing the heated magnetic disk portion to have a recording coercive field lower than the given recording coercive field; and
directing a magnetic recording field having an intensity greater than the recording coercive field of the heated magnetic disk portion onto the heated magnetic disk portion while the heated magnetic disk portion remains heated in order to magnetically record information onto the heated magnetic disk portion.

14. The method of claim 13 wherein:
the anodic alumina template has a size sufficient for holding an adequate amount of spaced apart CNTs for the CNTs to generate the electron beam with an area sized to locally heat multiple tracks of the magnetic disk portion.

15. The method of claim 13 wherein:
the anodic alumina template has a size sufficient for holding an adequate amount of spaced apart CNTs for the CNTs to generate the electron beam with an area focused to locally heat a single track of the magnetic disk portion.

16. The method of claim 13 further comprising:
positioning the heated magnetic disk portion away from the electron beam prior to directing the magnetic recording field onto the heated magnetic disk portion.

* * * * *